(12) United States Patent
Lin

(10) Patent No.: US 8,482,618 B2
(45) Date of Patent: Jul. 9, 2013

(54) REDUCTION OF MOTION-INDUCED BLUR IN IMAGES

(75) Inventor: Qian Lin, Santa Clara, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2041 days.

(21) Appl. No.: 11/063,060

(22) Filed: Feb. 22, 2005

(65) Prior Publication Data

US 2006/0187324 A1    Aug. 24, 2006

(51) Int. Cl.
*H04N 5/228* (2006.01)
(52) U.S. Cl.
USPC ...................................... 348/208.12

(58) Field of Classification Search
USPC ............... 348/241, 208.4, 208.12, 208.2, 61, 348/55, 362, 222.1, 221.1; 396/61, 55
See application file for complete search history.

(56) References Cited

U.S. PATENT DOCUMENTS

| | | | | |
|---|---|---|---|---|
| 5,130,739 | A * | 7/1992 | O'Such et al. | 396/63 |
| 5,880,777 | A * | 3/1999 | Savoye et al. | 348/217.1 |
| 6,859,618 | B1 * | 2/2005 | Yip | 396/61 |
| 7,239,342 | B2 * | 7/2007 | Kingetsu et al. | 348/208.4 |
| 7,432,953 | B2 * | 10/2008 | Washisu | 348/208.5 |
| 2004/0239771 | A1 * | 12/2004 | Habe | 348/208.12 |
| 2005/0133687 | A1 * | 6/2005 | Bock | 250/208.1 |

* cited by examiner

*Primary Examiner* — Tuan Ho
*Assistant Examiner* — Ahmed A Berhan

(57) ABSTRACT

A device captures images that are intentionally underexposed to reduce motion-related blur. Image processing is performed on the underexposed images. The processing includes reducing noise and increasing gain in the underexposed images.

13 Claims, 5 Drawing Sheets

REDUCTION OF MOTION-INDUCED BLUR IN IMAGES

BACKGROUND

A typical digital image capture device includes optics (e.g., a lens) and a photosensor array (e.g., a CCD, a CMOS sensor). During image capture, the optics focuses an image on the photosensor array, and individual photo-receptive elements of the array detect photons.

In low light conditions, the image is focused on the photosensor array for a relatively long time to allow the photo-receptive elements to detect a sufficient number of photons. If the image capture device needs a long exposure during image capture, and if the device is hand-held, there will be unavoidable movement of the device during image capture. As a result, the image capture device will produce a blurry image.

Capturing an image with a handheld device in low lighting conditions becomes increasingly difficult as the size of the photo-receptive elements is reduced, since the smaller photo-receptive elements need a longer exposure time to capture a sufficient number of photons. However, the current trend in image capture devices such as digital cameras is to reduce the size of the photo-receptive elements and increase the number of photo-receptive elements per photosensor array (in order to increase the resolution of the photosensor array). Once, the common consumer-level camera had a two megapixel array. Now, the common consumer-level camera has a five megapixel array. Soon, the common consumer-level camera will have an eight megapixel array. If a high resolution camera needs a long exposure during image capture, and if unavoidable movement of the camera occurs during image capture, the high resolution camera produces a blurry image having a high pixel count.

SUMMARY

According to one aspect of the present invention, an image capture device captures images that are intentionally underexposed in order to reduce motion-related blur. Other aspects and advantages of the present invention will become apparent from the following detailed description, taken in conjunction with the accompanying drawings, illustrating by way of example the principles of the present invention.

DETAILED DESCRIPTION

Figure 1:
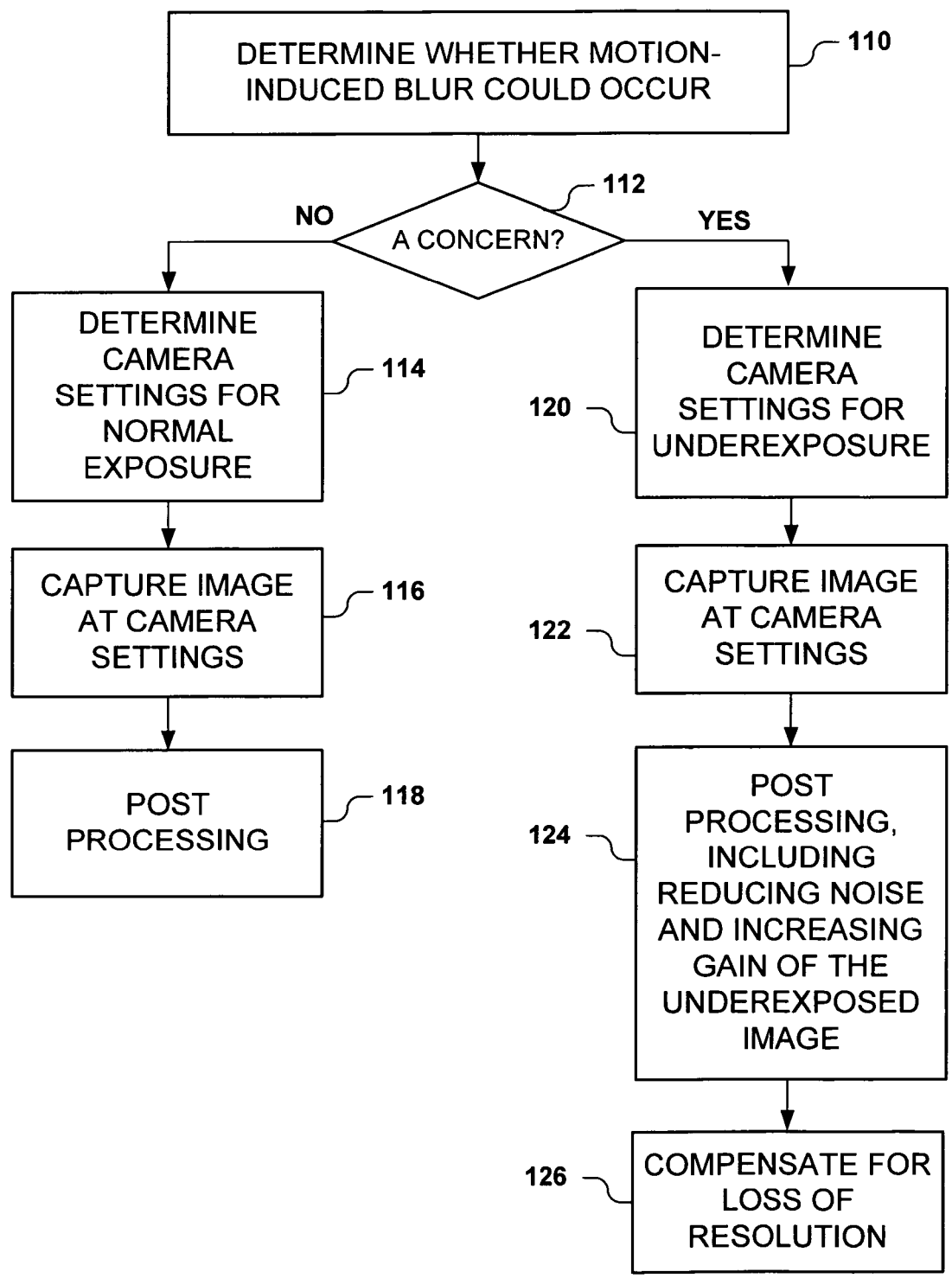
FIG. 1 is an illustration of a general method of generating and processing a digital image in accordance with an embodiment of the present invention.

Reference is made to FIG. 1, which illustrates a general method of generating and processing a digital image. An image capture device is used to capture an image. In the paragraphs that follow, the image capture device is described as a digital camera. However, this is done simply for the purposes of illustration. Images may be captured by devices including, but not limited to, cell phones, personal digital assistants (PDAs), camcorders, and handheld scanners.

During image capture, the digital camera determines whether motion-induced blur could occur in the captured image (block 110). The camera may make this determination automatically, by sensing camera motion, sensing lighting conditions, etc.

Motion-induced blur could result for several reasons. The following examples are non-limiting to the present invention. As a first example, a low lighting condition is sensed, and camera jitter is detected because an unsteady hand is holding the camera. As a second example, normal lighting conditions are detected, but rapid motion of an object in the image is also detected. As a third example, normal lighting conditions are detected, but camera jitter or other rapid camera motion is detected.

The camera determines whether the motion-induced blur will be a concern. This determination may be based on the amount of motion at the pixel level during exposure. As a first example of determining whether motion-induced blur will be a concern, the camera can sample a few areas of the image at the full resolution, sample the same areas again a short time later (e.g., a fraction of a second), and perform block matching to determine the motion between the two captures for each area. If the maximum motion is less then a threshold (e.g., 1 pixel), than blur will not be a concern.

As a second example, the camera may have a gyroscope or accelerometer onboard to measure the motion. If the motion is less than a threshold, blur will not be a concern.

The camera might even receive a manual input indicating that camera-related blur is not a concern. Such an input might be supplied if, for example, the camera is mounted on a tripod or other mount that eliminates jitter. If such an input is received, the camera could set the aperture to maximum and set a low shutter speed that will allow the photo-receptive elements of the photosensor array to capture a sufficient amount of photons.

If the motion-related blur is not a concern (block 112), the camera determines settings (e.g., aperture and shutter speed) for a normal exposure (block 114). Different combinations of aperture and shutter speed may be used to control the amount of photons that are exposed to the photosensor array.

The camera then captures the image at the camera settings (block 116). Depending on the photosensor array, the captured image will be fully sampled (i.e., contains full color information at each pixel) or undersampled (i.e., contains less than full color information at each pixel).

The captured image may be post-processed (block 118). If the captured image is undersampled, the post-processing may include transforming the undersampled image into a full color image. This step is commonly referred to as "demosaicing." A typical demosaicing algorithm interpolates the missing pixel information from the sampled pixel values in the mosaic image.

Post-processing on the captured image may also include, without limitation, color correction, tone mapping and compression. The post-processing may be performed partly or entirely by the camera.

If the motion-related blur is a concern (block 112), the camera determines settings (e.g., aperture and shutter speed) that will produce an underexposed image (block 120). The digital camera intentionally underexposes the image in order to reduce motion-related blur. The camera then captures the image at the camera settings (block 122).

The following examples are illustrative. If a low lighting condition and camera jitter are detected, the camera sets aperture to maximum, and increases shutter speed (and thereby reduces exposure time) in proportion to the amount of jitter.

If lighting conditions are normal, but either rapid object motion or rapid camera motion is detected, the camera captures the image at a higher-than-normal shutter speed. Camera motion such as jitter could occur if the camera is being held by an unsteady hand. Rapid object motion might occur if an object in a scene is moving rapidly. The amount of motion might be amplified if the camera optics have a high zoom setting.

If low lighting is detected, but no camera motion is detected, the camera could set the aperture to maximum and set a low shutter speed that will allow the photo-receptive elements of the photosensor array to capture a sufficient amount of photons. However, the exposure is prematurely terminated as soon as an on-board gyro (or motion sensor other than the photosensor array) detects motion.

In each of these three examples, underexposed images are captured. Although the images are underexposed, motion-induced blur is reduced or eliminated.

Post processing is performed on the underexposed image (block 124). Post-processing on the underexposed image includes reducing noise and increasing gain in the underexposed image. The noise can be reduced by smoothing the underexposed image. For example, the noise can be reduced by local averaging or by using a Gaussian filter. The gain can be increased to a level that corresponds to a normal exposure. For example, prior to capturing an image, the camera determines the photon level that would correspond to normal exposure. Tone mapping can then be used to increase the gain.

In the alternative, the noise can be reduced and the gain increased simultaneously by binning the pixels of the underexposed image. The noise reduction and gain boost can be performed inside or outside the digital camera.

The post-processing may also include, without limitation, demosaicing, color correction, tone mapping and compression. The post-processing may be performed partly or entirely by the camera.

The method may further include the optional step of compensating for the loss of resolution due to pixel binning (block 126). For example, a super-resolution technique may be used. Multiple images are generated for the same scene. These multiple images are averaged to reduce noise while keeping the resolution (the noise will be different in the different images).

The resolution compensation may instead be interleaved with pixel binning. The pixel binning may be performed on the each low resolution image or the binning may be performed on the high resolution image.

Figure 2:
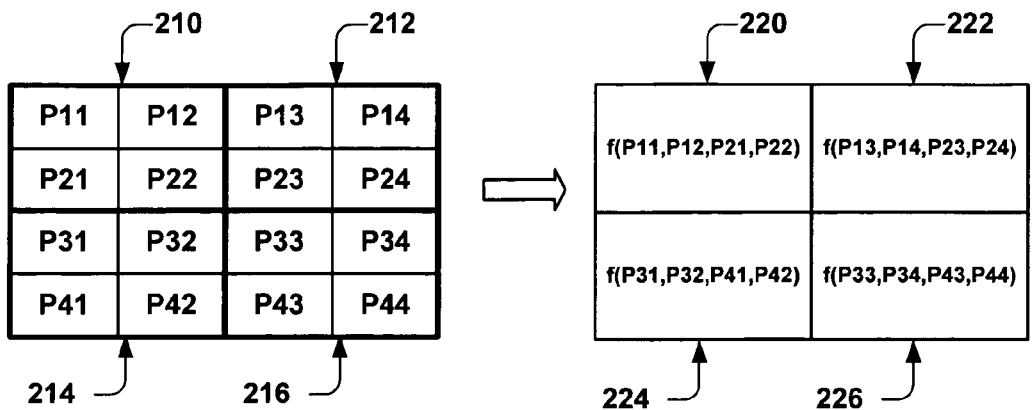
FIG. 2 is an illustration of pixel binning in a full color image in accordance with an embodiment of the present invention.

Reference is made to FIG. 2, which illustrates pixel binning on a raw full color digital image. Pixels in the raw image are denoted by Pij, where i and j are row and column indices. If the raw image is represented in RGB color space, each pixel describes a red color component, a blue color component and a green color component.

During pixel binning, the pixels are grouped into bins 210, 212, 214 and 216 (FIG. 2 shows bins of 2×2 pixels). Each bin 210, 212, 214 and 216 of pixels is combined into a single pixel 220, 222, 224 and 226 in an output image. Consider the example of a five megapixel camera that produces a raw digital image having 2272×1712 recorded pixels. If the bins are disjoint, and each bin has 2×2 pixels, then pixel binning on the raw image will produce an output image having 1136×856 pixels.

In some embodiments, the bins 210-216 may be disjoint. In other embodiments, bins may overlap (that is, two overlapping bins share at least one pixel).

The pixel binning is not limited to any particular binning function f( ). In some embodiments, the color of an output pixel may be computed as the average color of the pixels in the corresponding bin. Equal weights may be assigned to the pixels. For example, if the image is represented in RGB color space and each bin has 2×2 pixels, the red color component of the output pixel 220 may be obtained by averaging the red components of the pixels P11, P12, P21 and P22 in the first bin 210; the green component of the output pixel 220 may be obtained by averaging the green components of the pixels P11, P12, P21 and P22 in the first bin 210; and the blue component of the output pixel 220 may be obtained by averaging the blue components of the pixels P11, P12, P21 and P22 in the first bin 210.

In some other embodiments, a weighted average of pixels may be taken. For example, the center pixel may be assigned a higher weight than its neighboring pixels.

In still other embodiments, the weights may be determined adaptively. For example, bins containing edges can be identified, and the pixels in those bins can be weighted such that edge information is not lost.

Figure 3:
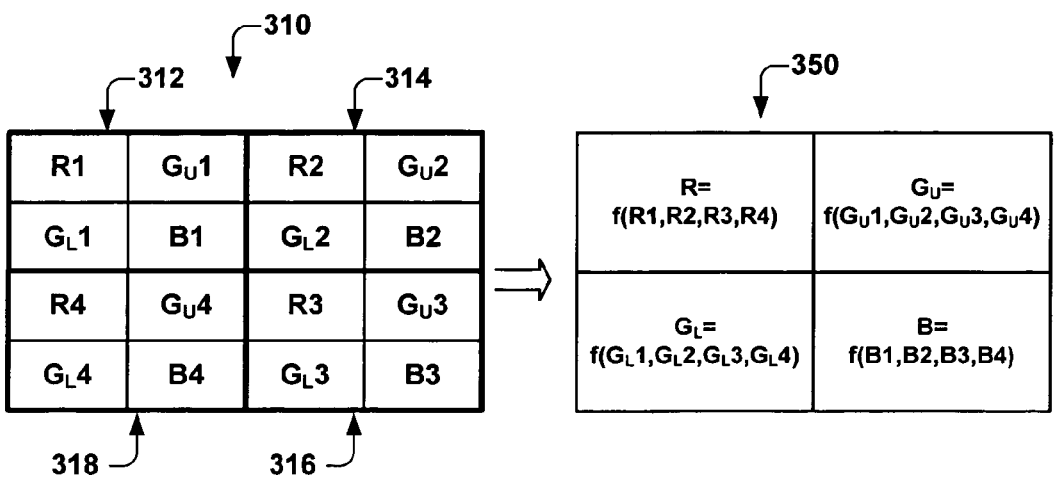
FIG. 3 is an illustration of pixel binning in an undersampled image in accordance with an embodiment of the present invention.

FIG. 3 illustrates pixel binning on an undersampled or mosaic image. The undersampled image 310 of FIG. 3 is generated by a photosensor array that has its photo-receptive elements arranged in a Bayer color filter array. The elements are arranged in 2×2 cells, which are repeated (tiled) across the photosensor array. Each cell consists of two photo-receptive elements that are sensitive to green light only, one photo-receptive elements that is sensitive to red light only, and one photo-receptive elements that is sensitive to blue light only. Each 2×2 cell 312 of the undersampled image 310 is produced by a cell in the photosensor array. Each pixel 314 of the image 310 has a single color sample.

Consider the binning of four adjacent cells 312, 314, 316 and 318 of the undersampled image 310 into a single output cell 350. The pixel binning can be performed by combining red samples (R1, R2, R3, R4) to produce a single red sample (R) in the output cell 350; combining blue samples (B1, B2, B3, B4) to produce a single blue sample (B) in the output cell 350; combining the green samples in the upper right corners ($G_U$1, $G_U$2, $G_U$3, $G_U$4) to produce a single green sample ($G_U$) in the upper right corner of the output cell 350; and combining the green samples in the lower left corners ($G_L$1, $G_L$2, $G_L$3, $G_L$4) to produce a single green sample ($G_L$) in the lower left corner of the output cell 350; As a result of the binning, four 2×2 cells 312-318 of undersampled pixels are binned to produce a single 2×2 cell 350 of undersampled pixels.

The effect of pixel binning is illustrated in Table 1. Although the actual shutter speed is 1/60 for each bin size, the effective shutter speed is reduced as bin size is increased. Image size is also reduced as bin size is increased.

TABLE 1

| Bin Size (in pixels) | 1 × 1 | 2 × 2 | 3 × 3 | 4 × 4 |
|---|---|---|---|---|
| Actual shutter Speed | 1/60 | 1/60 | 1/60 | 1/60 |
| Effective shutter speed | 1/60 | 1/15 | 1/6 | 1/4 |
| Photo size | 2272 × 1712 | 1136 × 856 | 757 × 570 | 568 × 428 |

Under normal lighting conditions, larger bins are usually more effective for reducing noise. Therefore, under normal lighting conditions and camera motion, bin sizes of 3×3 and 4×4, may be used. Under low lighting conditions, however, the raw image might contain an overwhelming amount of noise. Therefore, a bin size of 2×2 pixels is preferred.

The pixel binning can be performed in software, on digital words representing the pixels. That is, the pixel binning can be performed after the photosensor array has read out charges and performed analog-to-digital conversion.

In the alternative, the pixel binning can be performed in hardware by cameras using CMOS sensors. Charges can be summed prior to analog-to-digital conversion. An example of pixel binning prior to A/D conversion is disclosed in assignee's U.S. Pat. No. 6,812,963.

Thus, pixel binning may be performed on a full color image or an undersampled image. If the photosensor array generates an undersampled image, the demosaicing, pixel binning, and post processing can be performed in different orders.

Figure 4:
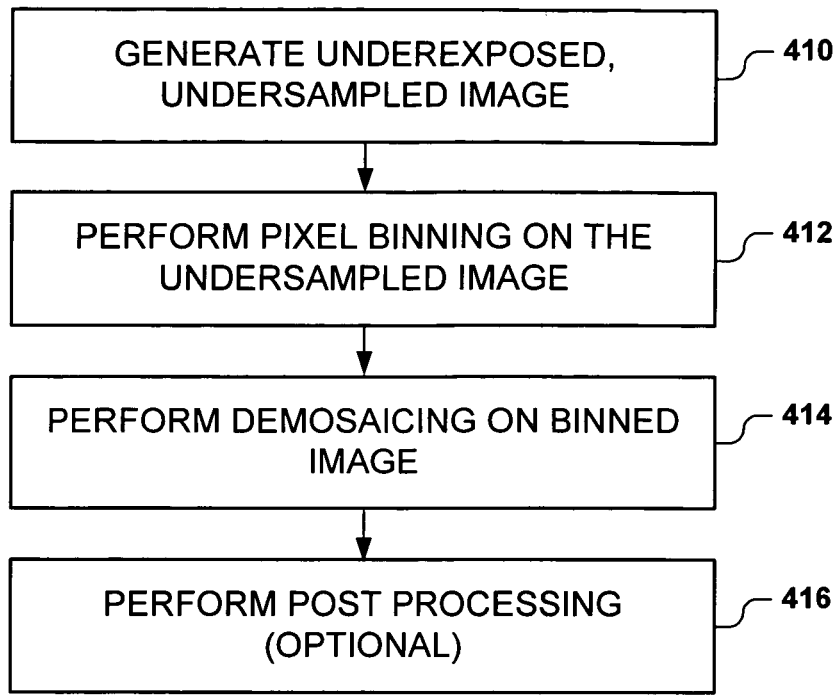
FIGS. 4-6 are illustrations of different embodiments of performing a method according to the present invention.

Reference is now made to FIG. 4, which illustrates a first order. An underexposed, undersampled image is generated (block 410), and pixel binning is performed on the undersampled image (block 412). Demosaicing is performed on the binned image to produce a full color image (block 414). Post processing, which is optional, may then be performed on the full color image (block 416).

Figure 5:
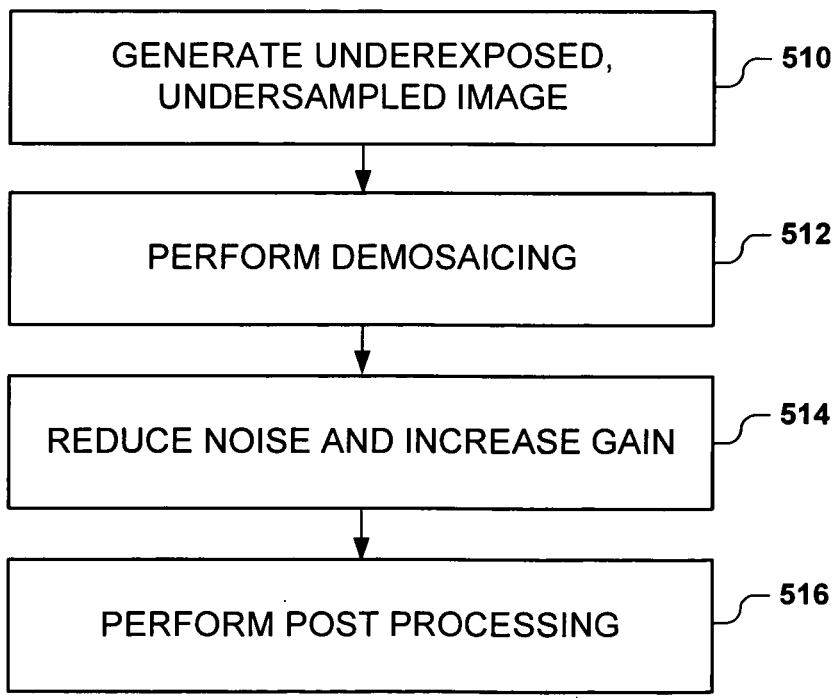

Reference is now made to FIG. 5, which illustrates a second order. An underexposed, undersampled image is generated (block 510), and demosaicing is performed on the undersampled image (block 512). The demosaicing produces an underexposed image having full color information at each pixel. Noise in the full color image is reduced, and gain is increased (block 514). Post-processing is then performed on the image (block 516).

Figure 6:
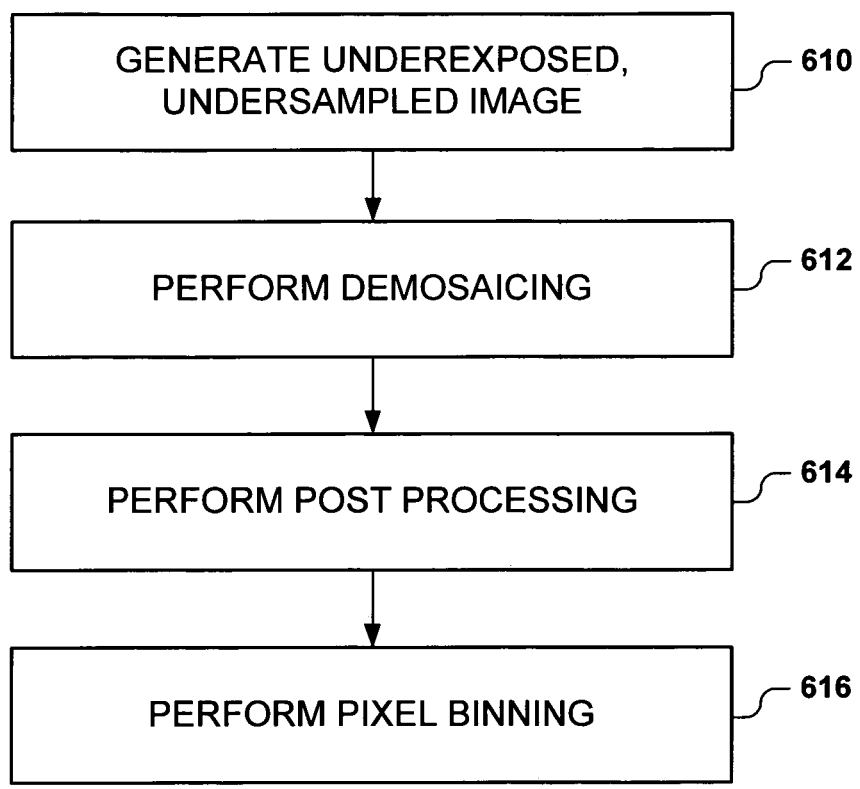

Reference is now made to FIG. 6, which illustrates a third order. An underexposed, undersampled image is generated (block 610), demosaicing is performed on the undersampled image (block 612), and post-processing is performed on the full color image (block 614). After post processing, the pixel binning is performed on the post-processed image (block 616).

For each of these three orders, the pixel binning (or more generally the noise reduction/gain boost) may be performed inside or outside the camera. The pixel binning may be performed outside the camera, for example by downloading the (raw, demosaiced or post-processed) underexposed image to a computer, and running a computer application that performs the pixel binning.

Figure 7:
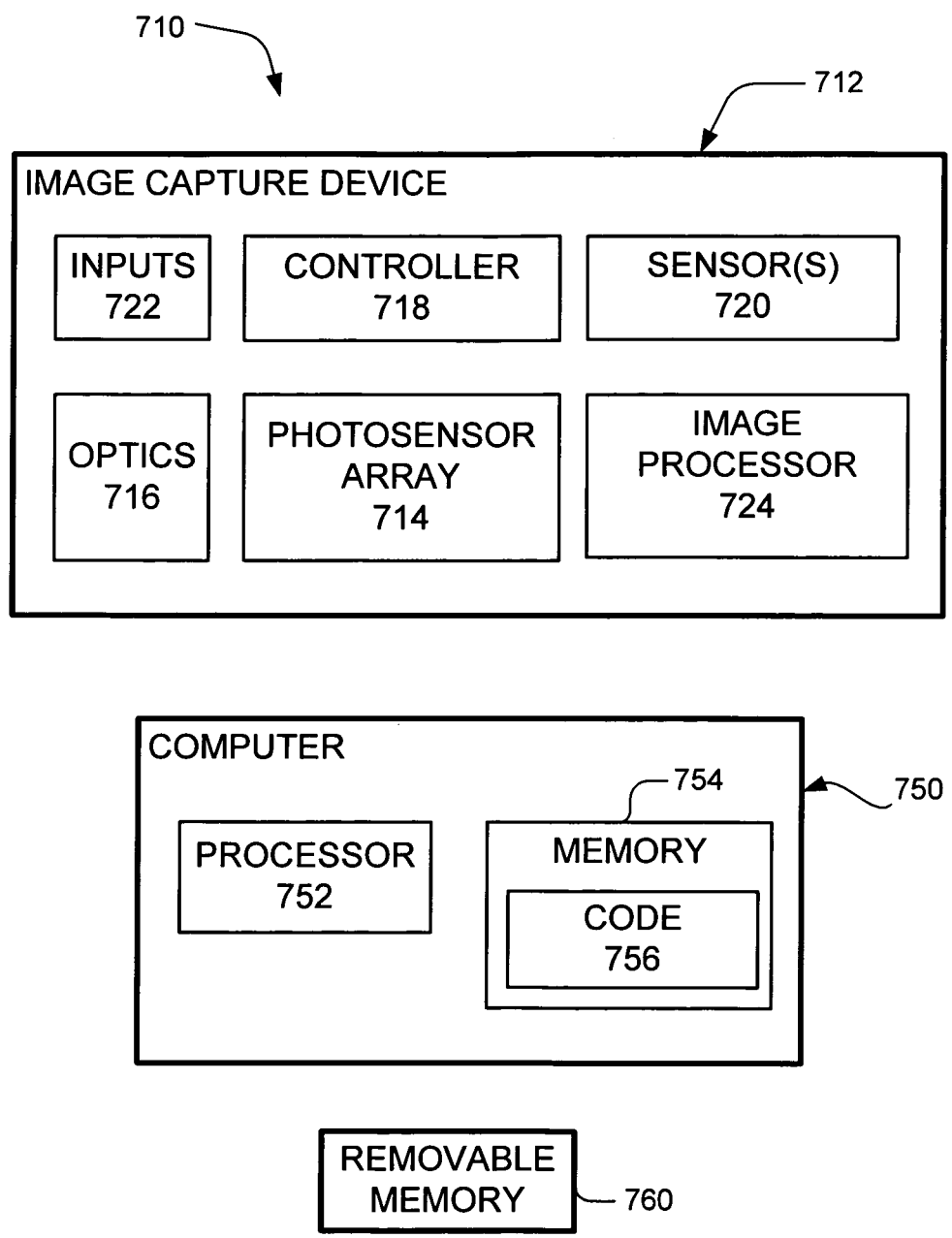
FIG. 7 is an illustration of a system in accordance with an embodiment of the present invention.

Reference is now made to FIG. 7, which illustrates an image capture and processing system 710. The system 710 includes an image capture device 712 having a photosensor array 714, optics 716, and a controller 718. The controller 718 may include a processor, and memory (e.g., programmable read only memory such as EEPROM). The controller memory stores data for causing the controller 718 to control the device 712. The data includes processor instructions, tables, etc.

The image capture device 712 may also have a sensor 720 for detecting background light level. The image capture device 712 can set or adjust the exposure time based on the sensed motion and light levels.

The image capture device 712 may use the photosensor array 714 to detect motion that could cause motion-induced image blur. For example, the image capture device 712 can (be operated in a preview mode to) use the photosensor array 714 to capture a sequence of low resolution images. From a comparison of these low resolution images, motion of the image capture device, or motion of objects in an image, or both can be sensed.

In addition or in the alternative, the image capture device 712 could have an on-board sensor 720 for sensing motion of the device 712. A sensor such as a gyroscope or accelerometer may be used.

The image capture device 712 may have input devices (e.g., buttons, knobs), 722 that allows users to make manual inputs. Typical manual inputs of a camera, for example, include operating mode, focus, zoom, flash, and aperture. An input device 722 could also provide a user option that forces image underexposure and on-board binning. This user option could be selected if, for instance, the camera flash it turned off, or if the flash won't reach the scene.

The image capture device 712 may also include a processor 724 (e.g., a digital signal processor, an ASIC) for processing the raw image captured by the photosensor array 714. The processing may include pixel binning, demosaicing (if the photosensor array 714 generates undersampled images), and post processing. The image capture device 712 could provide a user option of performing some or the entire image processing outside of the image capture device 712.

The image capture device 712 is not limited to any particular type. For example, the image capture device 712 could be a digital camera, a cell phone, a personal digital assistant, a camcorder, or a handheld scanner.

The system 710 may further include a standalone image processor having substantially greater processing power than the image capture device 712. For example, the system 710 may include a computer 750 having a general purpose processor 752 and memory 754 that stores more sophisticated post processing code 756. The computer 750 could perform noise reduction and gain boost as part of a standalone application or it could be performed by a larger image processing application (e.g., an image editing program). The code 756 for noise reduction and gain boost may be distributed to the computer 750 via removable memory 760 such as an optical disk.

An image capture device according to the present invention is not limited to a digital device. For example, a film-based camera could be adapted to intentionally produce underexposed images in order to reduce motion-related blur. Photos of underexposed images could then be digitized, and the resulting digital images could be processed to reduce noise and boost gain.

Although several specific embodiments of the present invention have been described and illustrated, the present invention is not limited to the specific forms or arrangements of parts so described and illustrated. Instead, the present invention is construed according to the following claims.

The invention claimed is:

1. An image capture device for capturing images that are intentionally underexposed in order to reduce motion-related blur, the image capture device comprising:
 a photosensor array;
 a controller for controlling the array to capture images that are intentionally and selectively underexposed in order to reduce motion-related blur;
 means for detecting motion of objects of the images that can cause motion-induced image blur; and
 means for detecting lighting conditions; wherein the controller is configured to evaluate the detected lighting conditions and the detected motion to determine, before the underexposed images are being captured by the photo sensor array, whether the images should be intentionally underexposed based on the detected lighting conditions and the detected motion.

2. The image capture device of claim 1, wherein the controller controls aperture and shutter speed.

3. The image capture device of claim 1, wherein the controller causes the array to perform pixel binning on the underexposed images, whereby noise reduction and a gain boost are performed simultaneously.

4. The image capture device of claim 1, wherein the underexposed image is also undersampled; and wherein for a bin in the undersampled image, first color samples in the bin are combined into a first component of an output pixel, second color samples in the bin are combined into a second component of the output pixel, and third color samples in the bin are combined into a third component of the output pixel.

5. The image capture device of claim 1, further comprising a processor reducing noise and increasing gain in the image captured by the image capture device by smoothing the underexposed digital image and performing tone mapping on the smoothed image.

6. The image capture device of claim 1, wherein pixels of the underexposed digital image are binned to simultaneously reduce noise and increase gain of the underexposed digital image.

7. The image capture device of claim 6, wherein the image capture device performs demosaicing on the underexposed digital image after reducing the noise and increasing the gain.

8. The image capture device of claim 6, wherein the image capture device performs demosaicing on the underexposed digital image before reducing the noise and increasing the gain.

9. The image capture device of claim 6, wherein the image capture device performs pixel binning after performing demosaicing and post-processing.

10. The image capture device of claim 1, further comprising a processor that compensates for a loss of image resolution after noise has been reduced and gain increased.

11. The image capture device of claim 1, wherein the image capture device is one of a group consisting of a digital camera, a cell phone, a personal digital assistant, a camcorder, and a handheld scanner.

12. An image capture device comprising:
    means for capturing an image that is intentionally and selectively underexposed, the image being underexposed to reduce motion-related blur;
    means for reducing noise and increasing gain in the underexposed image;
    a controller means for controlling the means for capturing to capture the image that is intentionally underexposed;
    means for detecting motion of an object of the image that can cause motion-induced image blur; and
    means for detecting lighting conditions; wherein the controller means is configured to evaluate the detected lighting conditions and the detected motion to determine, before the underexposed image is being captured by the means for capturing an image, whether the image should be intentionally underexposed based on the detected lighting conditions and the detected motion.

13. The image capture device of claim 12, further comprising means for post processing the image after the noise has been reduced and the gain increased.

* * * * *